United States Patent

Chang et al.

(10) Patent No.: US 6,819,826 B2
(45) Date of Patent: Nov. 16, 2004

(54) OPTICAL SWITCH

(75) Inventors: Sean Chang, Tao Yuan (TW);
Shih-chien Chang, Taipei County (TW)

(73) Assignee: Delta Electronics, Inc. (TW)

( * ) Notice: Subject to any disclaimer, the term of this patent is extended or adjusted under 35 U.S.C. 154(b) by 4 days.

(21) Appl. No.: 10/170,801

(22) Filed: Jun. 12, 2002

(65) Prior Publication Data

US 2003/0108277 A1 Jun. 12, 2003

(30) Foreign Application Priority Data

Dec. 11, 2001 (TW) .......................... 90130718 A (51) Int. Cl.[7] .............................. G02B 6/26; G02B 6/42
(52) U.S. Cl. ............................................ 385/18
(58) Field of Search ..................... 385/16–19, 24–25; 398/55, 57; 359/117, 128

(56) References Cited

U.S. PATENT DOCUMENTS

| | | | | |
|---|---|---|---|---|
| 4,303,303 A | * | 12/1981 | Aoyama | 385/18 |
| 4,322,126 A | * | 3/1982 | Minowa et al. | 385/18 |
| 4,484,793 A | * | 11/1984 | Laude | 385/22 |
| 5,208,880 A | * | 5/1993 | Riza et al. | 385/18 |
| 5,838,847 A | * | 11/1998 | Pan et al. | 385/16 |
| 6,320,996 B1 | * | 11/2001 | Scobey et al. | 385/18 |
| 6,374,009 B1 | * | 4/2002 | Chang et al. | 385/18 |
| 6,477,289 B1 | * | 11/2002 | Li | 385/16 |
| 6,529,655 B1 | * | 3/2003 | Jurbergs | 385/19 |
| 6,542,658 B2 | * | 4/2003 | Takeuchi et al. | 385/18 |
| 6,587,608 B2 | * | 7/2003 | Cormack | 385/16 |
| 2002/0048426 A1 | * | 4/2002 | Zhu et al. | 385/18 |

* cited by examiner

*Primary Examiner*—Edward J. Glick
*Assistant Examiner*—Thomas R Artman
(74) *Attorney, Agent, or Firm*—Martine & Penilla, LLP (57) ABSTRACT

An optical switch includes at least one input end, at least one output end, a reflective device and a switching device. The reflective device includes at least one flat glass and at least one reflective element provided on the flat glass. The switching device changes the position where the at least one ray enters the reflective device. The at least one output end selectively output the at least one ray after the at least one reflective element reflects it. Alternatively, a plurality of reflective elements are provided. The reflective elements are disposed in the reflective device such that the reflective device has a plurality of reflective regions. When the switching device switches the rays to enter different reflective regions, the rays can be output from different output ends.

8 Claims, 12 Drawing Sheets

OPTICAL SWITCH

BACKGROUND OF THE INVENTION

1. Field of the Invention

The invention relates to an optical switch and, in particular, to an optical switch using reflective elements disposed in parallel to switch optical paths.

2. Description of the Related Art

Figure 1A:
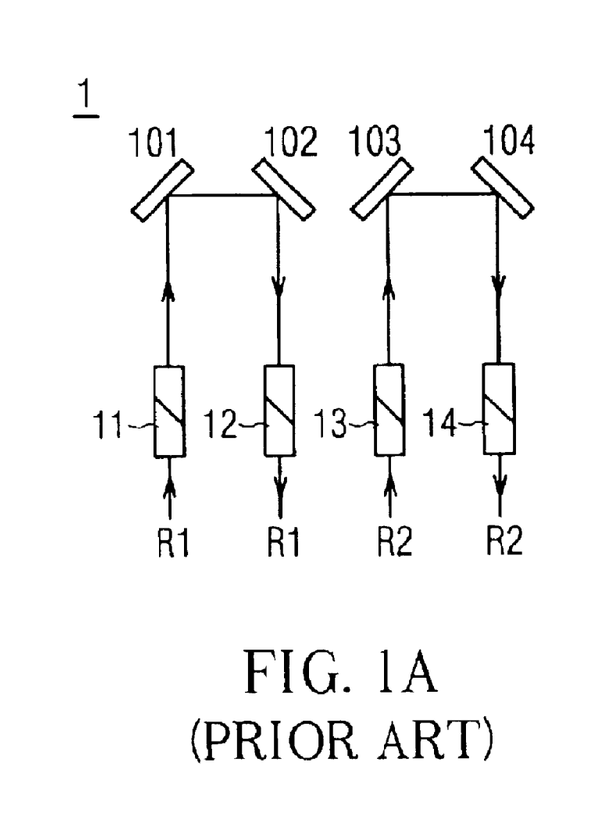
FIGS. 1A and 1B are schematic illustrations showing a conventional optical switch.
Figure 1B:
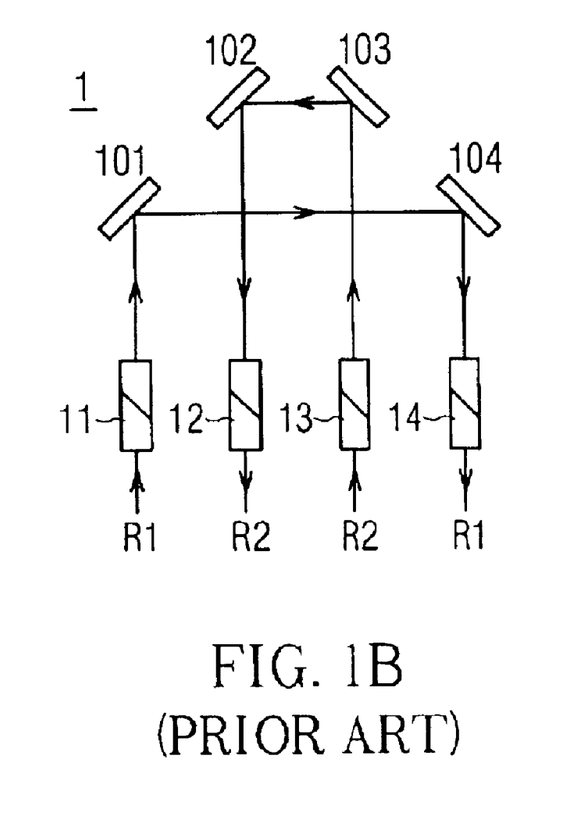

In a currently used optical switch, a number of mirrors are used to change the optical paths of incident light and are shifted for switching light outputs at different output ends. FIGS. 1A and 1B show two different states of this optical switch, respectively. In FIGS. 1A and 1B, a collimator 11 and a collimator 13 serve as input ends, and a collimator 12 and a collimator 14 serve as output ends.

Referring to FIG. 1A, in a conventional optical switch 1, the collimators 11 and 13 receive a first ray R1 and a second ray R2, respectively. The first ray R1 is output from the collimator 12 after reflected by the mirrors 101 and 102. The second ray R2 is output from the collimator 14 after reflected by the mirrors 103 and 104.

Referring to FIG. 1B, if the mirrors 102 and 103 are shifted for changing the state of the optical switch 1, the optical paths of the first ray R1 and the second ray R2 are changed. After positions of the mirrors 102 and 103 are changed, the first ray R1 is output from the collimator 14 after reflected by the mirrors 101 and 104. On the other hand, the second ray R2 is output from the collimator 12 after reflected by the mirrors 103 and 102. The optical switch 1 can switch output ray to the desired collimator by way of shifting the mirror.

One drawback of the above-mentioned optical switch is that the manufacturing cost is relatively high. First, when the mirrors are shifted for switching, any errors in the positioning of the mirrors will affect the optical path; therefore the error control has to be relatively accurate so as not to adversely influence the switching effect. In addition, since the positioning accuracy of each mirror may greatly influence the alignment of each collimator during the assembling process, the position of each mirror must be relatively accurate. Due to the above-mentioned factors and the fact that there are a great many mirrors used in the optical switch, the manufacturing cost of such an optical switch is relatively high.

In addition, the example stated above is only a 2×2 optical switch. If the number of input ends or output ends is increased, such as a 3×3 optical switch or larger, a greater number of mirrors must be used. In this case, the difficulties of manufacturing and assembling these devices are significantly increased with an increase in the number of input ends or output ends, and the manufacturing cost is also greatly increased.

SUMMARY OF THE INVENTION

In view of the above-mentioned problems, it is an important object of the invention to provide an optical switch capable of decreasing the number of used elements.

Another object of the invention is to provide an optical switch capable of decreasing the difficulty of alignment in the manufacturing process.

To achieve the above-mentioned objects, an optical switch in accordance with the invention includes at least one input end, at least one output end, a reflective device and a switching device. The reflective device includes at least one flat glass and at least one reflective element provided on the flat glass. The switching device switches the position where the ray enters the reflective device and transmits the ray to selectively output from one of the output ends after the ray is reflected by the reflective element.

The reflective element can be a reflective film coated or attached on the flat glass. The flat glass has two parallel optical planes, and the reflective element is coated or attached on one of the optical planes.

When there are a plurality of reflective elements, the reflective element is disposed in the reflective device such that the reflective device has a plurality of reflective regions. When entering different reflective regions, the rays are output from different output ends.

The switching device can be a linear driving device for moving the reflective device. The linear driving device moves the reflective device closer to or away from the input end, or in a direction perpendicular to a plane containing the optical paths.

The switching device can also include a rotatable flat glass disposed between the input end and the reflective device. The rotatable flat glass is rotated to change a deflection offset ofr the ray after being refracted so as to change the position where the ray enters the reflective device.

DETAILED DESCRIPTION OF THE PREFERRED EMBODIMENTS

The optical switch in accordance with the preferred embodiments of the invention will be described with reference to the accompanying drawings, wherein the same reference numbers denote the same elements.

The invention uses a reflective device to switch optical paths. In the reflective device, a plurality of optical reflective elements parallel to each other are provided. Changing the incident positions of rays incident on the reflective device, the optical switch may change the output states of the rays.

In the following description, the first embodiment switches the output states of the rays by moving the reflective device closer to, or away from the input ends. In the second and third embodiments, the reflective device includes a plurality of reflective regions. The rays are switched to be incident on different reflective regions, and are output from different output ends. In the second embodiment, the reflective device is moved to switch the rays incident on reflective regions. In the third embodiment, the deflection offset is changed to switch the rays incident on reflective regions.

First Embodiment

Figure 2A:
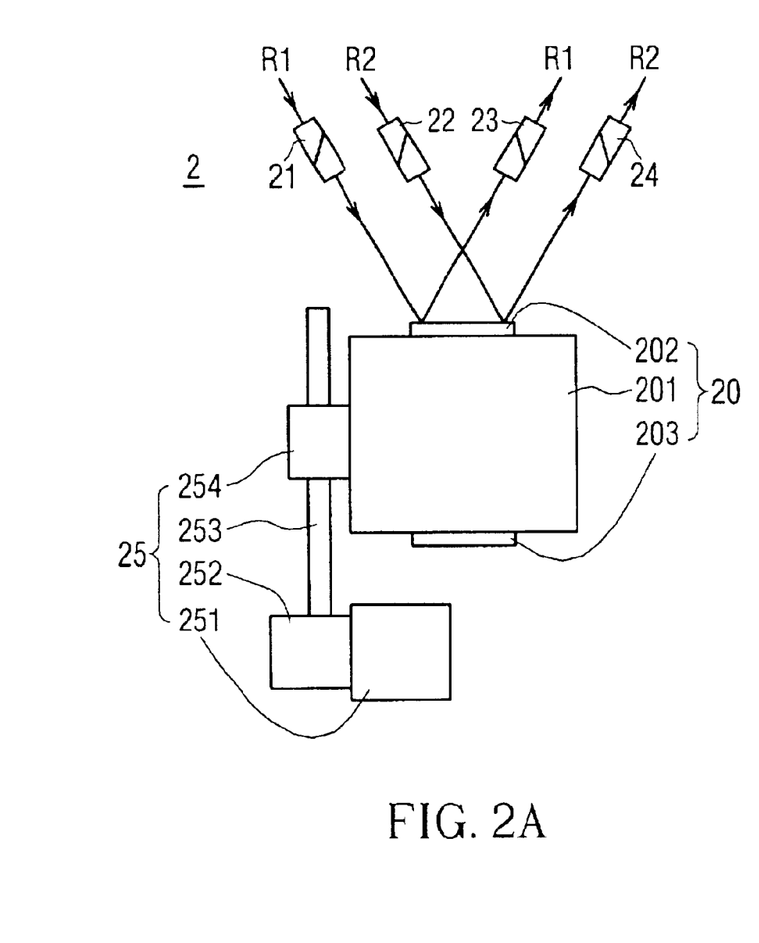
FIGS. 2A and 2B are schematic illustrations showing an optical switch in accordance with a first embodiment of the invention.
Figure 2B:
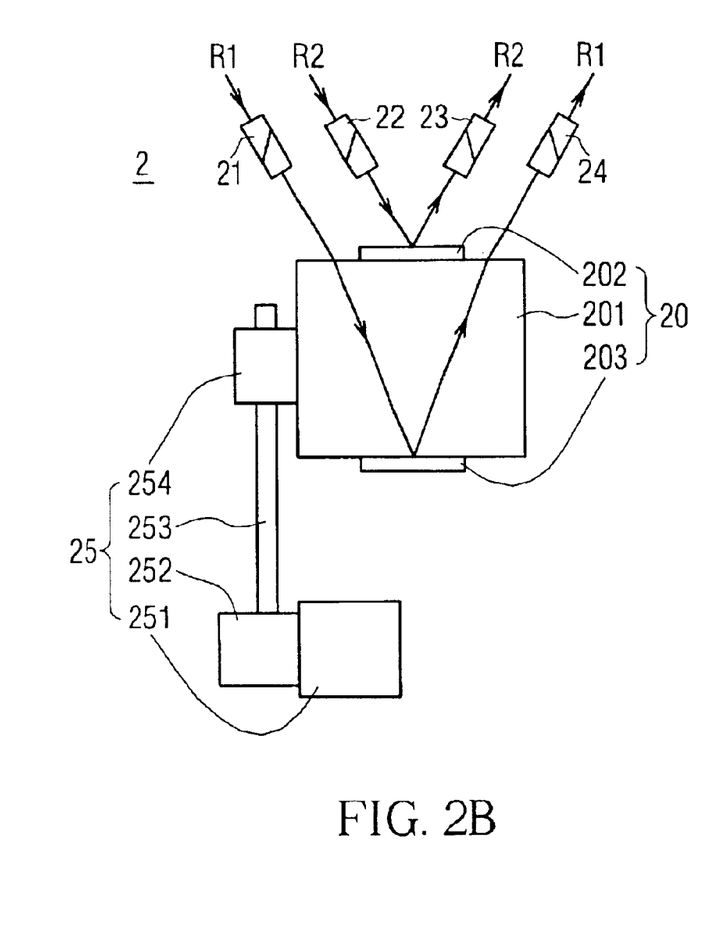

Referring to FIGS. 2A and 2B, an optical switch 2 in accordance with the first embodiment of the invention includes a reflective device 20, four collimators 21, 22, 23 and 24, and a switching device 25. The collimators 21 and 22 are disposed at a first input end and a second input end in the optical switch 2, respectively, and receive the first ray R1 and the second ray R2, respectively. The collimators 23 and 24 are disposed at a first output end and a second output end of the optical switch 2, respectively.

The reflective device 20 includes a flat glass 201, and a first reflective film 202 and a second reflective film 203 coated or attached on two parallel planes of the flat glass 201. The first reflective film 202 is nearer the collimators 21 and 22 than the second reflective film 203. The switching device 25 is a linear driving mechanism for moving the reflective device 20 to different positions.

FIG. 2A shows a first state of the optical switch 2. In the first state, the first ray R1 and the second ray R2 received by the collimators 21 and 22 are incident on the first reflective film 202 of the reflective device 20. The first reflective film 202 reflects the first ray R1 to the collimator 23 and reflects the second ray R2 to the collimator 24.

FIG. 2B shows a second state of the optical switch 2. In the second state, the position of the reflective device 20 is nearer the collimators 21, 22, 23 and 24 in comparison with the first state as shown in FIG. 2A. Under this condition, the first ray R1 received by the collimator 21 is directly incident to the flat glass 201. After refracted by the flat glass 201, the first ray R1 is reflected by the second reflective film 203 and then transmitted out of the flat glass to be output from the collimator 24.

On the other hand, the second ray R2 is incident on the first reflective film 202 of the reflective device 20. However, since the reflective device 20 is moved to another position, the first reflective film 202 reflects the second ray R2 to the collimator 23 but not to the collimator 24.

In this embodiment, the switching device 25 may be any linear driving mechanism capable of moving the reflective device 20 with respect to the collimator. For example, a conventional combination of a motor 251, a gear shell 252, a lead screw 253 and a nut 254 may be adopted for the switching device 25, as shown in FIGS. 2A and 2B. Since this technology is well known to those skilled in the art, the description thereof is omitted.

Figure 3A:
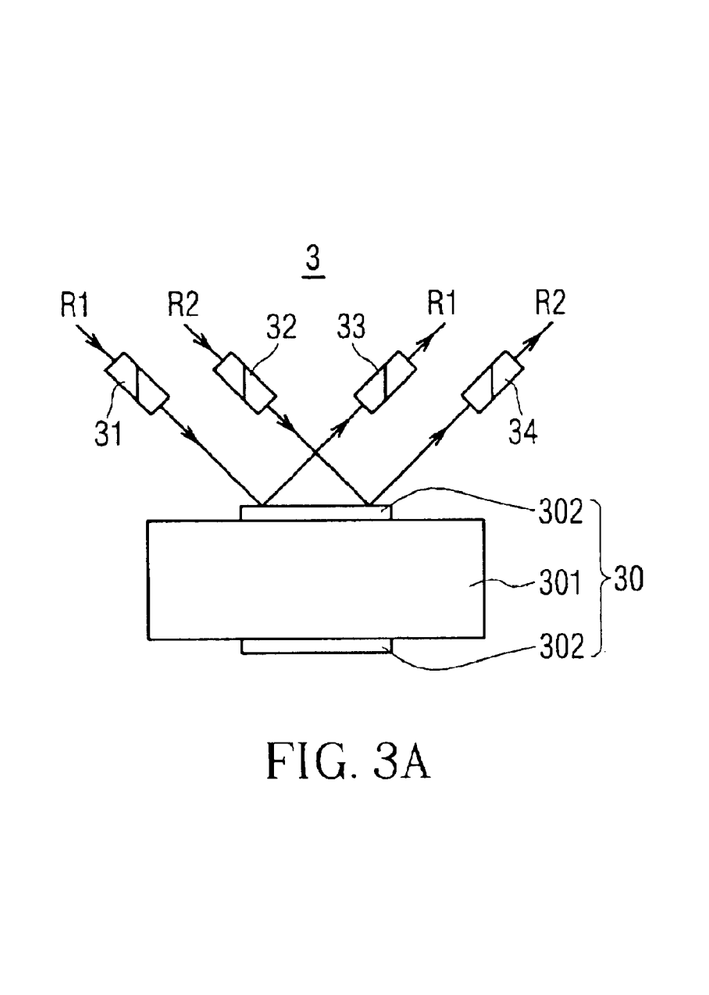
FIGS. 3A and 3B are schematic illustrations showing the optical switch in accordance with another aspect of the first embodiment of the invention.
Figure 3B:
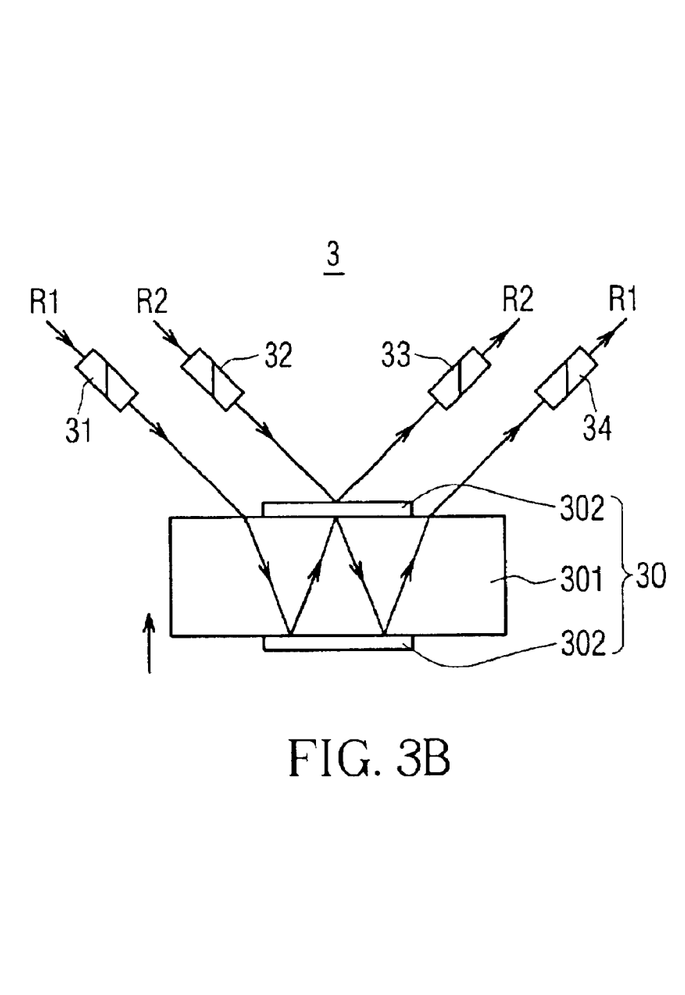

From FIGS. 2A and 2B, it should be noted that both the size of the first reflective film 202 and the thickness of the flat glass relate to the positioning angles of the collimators. Therefore, if the positioning angles of the collimators with respect to the reflective device 20 are changed, both the size of the first reflective film 202 and the thickness of the flat glass have to be changed. For example, FIGS. 3A and 3B show another different design. For the sake of ease of description, the switching device for moving the reflective device is omitted in FIGS. 3A and 3B. Referring to FIG. 3A, similar to the condition shown in FIG. 2A, the first ray R1 and the second ray R2 are incident on a first reflective film 302 of the reflective device 30 from the collimators 31 and 32, and reflected by the first reflective film 302 to the collimators 33 and 34, respectively. However, when the reflective device 30 moves to the specific position shown in FIG. 3B, the first ray R1 is directly incident on the flat glass 301 and reflected by a second reflective film 303. After reflected by the second reflective film 303, the first ray R1 is incident on and reflected by the first reflective film 302 to the second reflective film 303 again. After reflected by the second reflective film 303, the first ray R1 is transmitted through the flat glass to the collimator 34.

Compared with FIGS. 2A and 2B, the flat glass 301 in the examples shown in FIGS. 3A and 3B is thinner. In addition, the optical path of the first ray R1 is different from that of the second ray R2.

Figure 4:
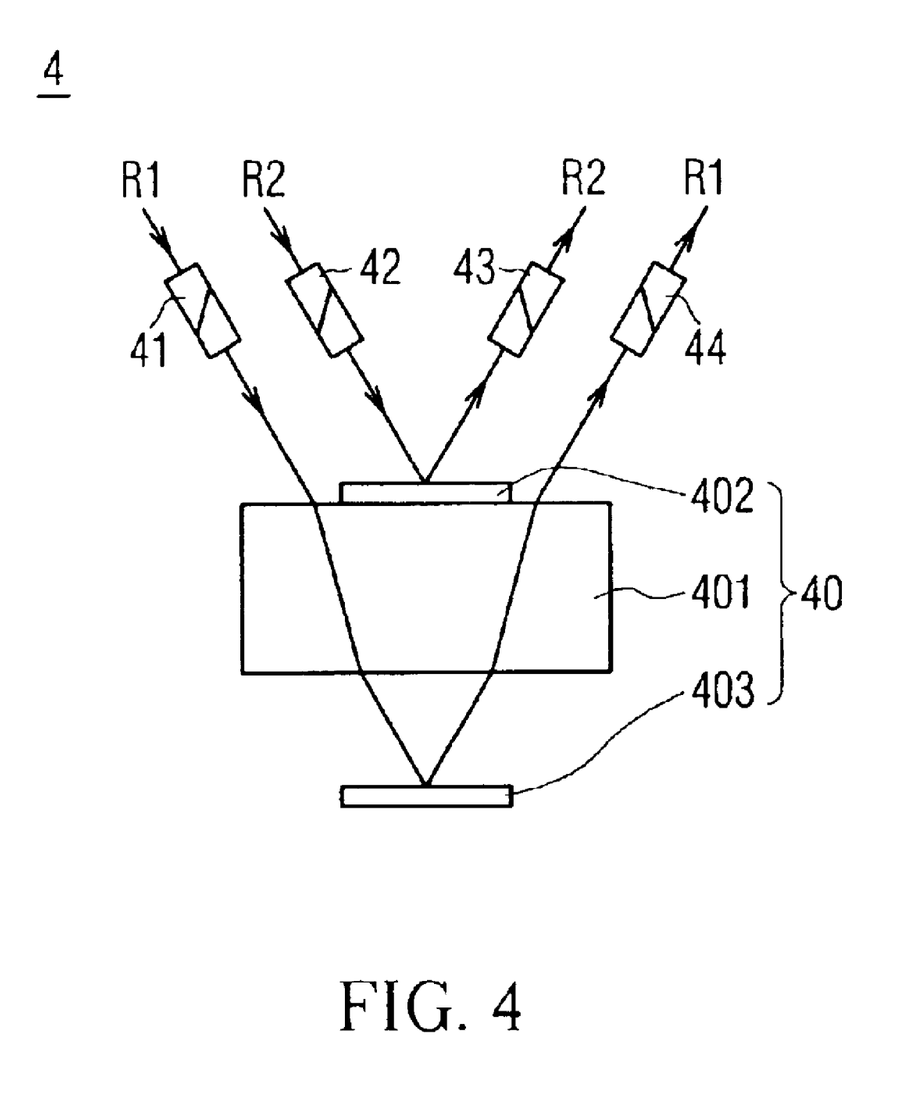
FIG. 4 is a schematic illustration showing the optical switch in accordance with still another aspect of the first embodiment of the invention.

FIG. 4 shows still another different design. For the sake of ease of description, the switching device for moving the reflective device is omitted.

In FIG. 4, a reflective device 40 includes a flat glass 401, a reflective film 402 coated on the flat glass 401, and a mirror 403. The mirror 403 is mainly used to substitute for the above-mentioned second reflective films 203 and 303. When the first ray R1 is not reflected by the reflective film 402, it passes through the flat glass 401 and is reflected by the mirror 403. Then, the first ray R1 passes through the flat glass 401 again and is output from a collimator 44.

Second Embodiment

Figure 5A:
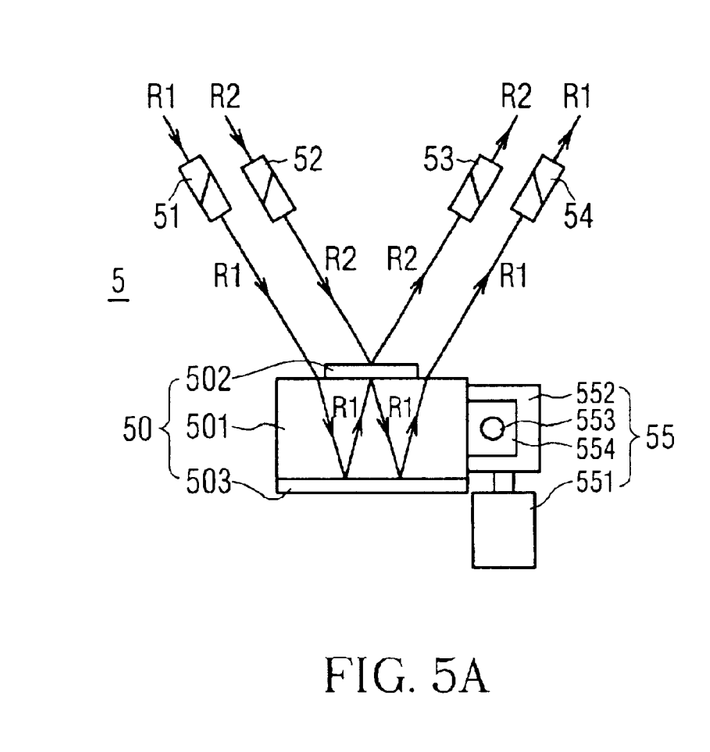
FIGS. 5A to 5F are schematic illustrations showing an optical switch in accordance with a second embodiment of the invention.
Figure 5B:
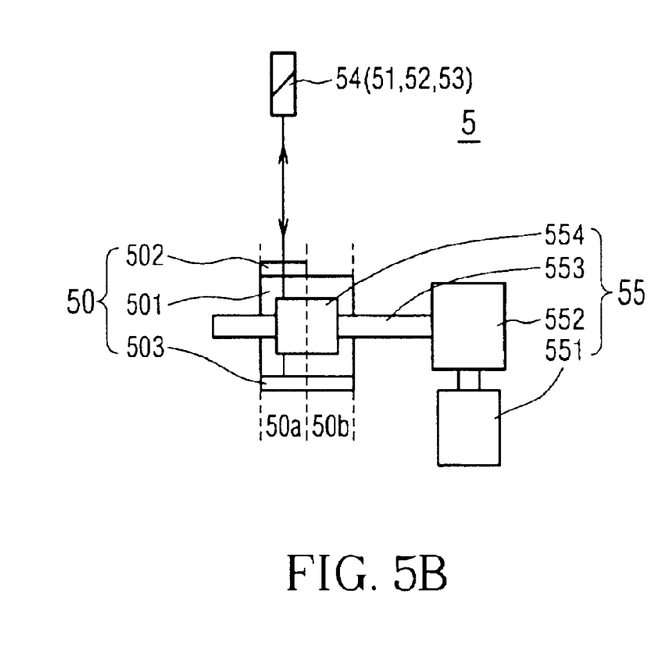
Figure 5C:
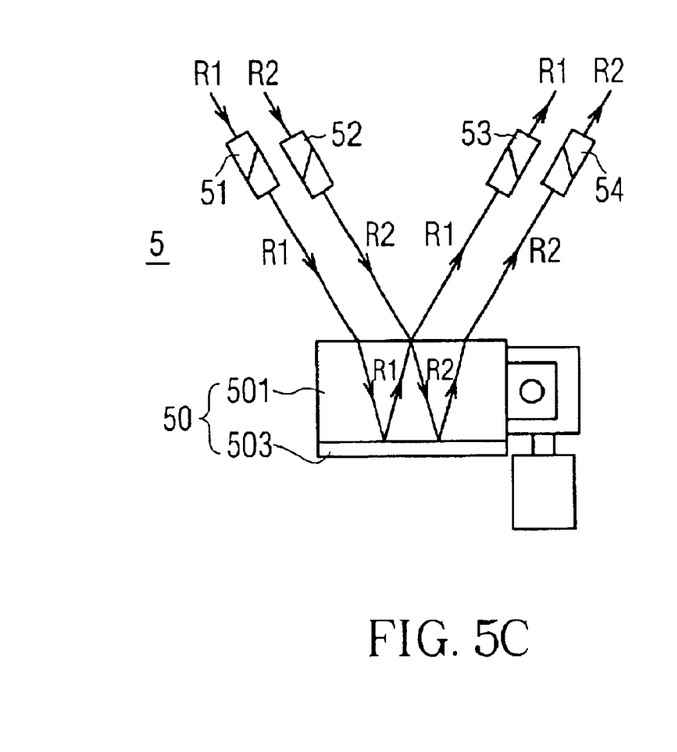
Figure 5D:
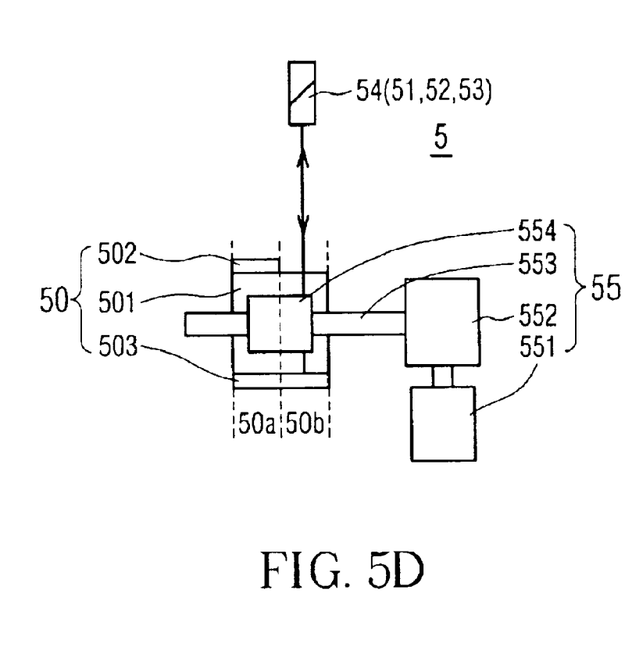
Figure 5E:
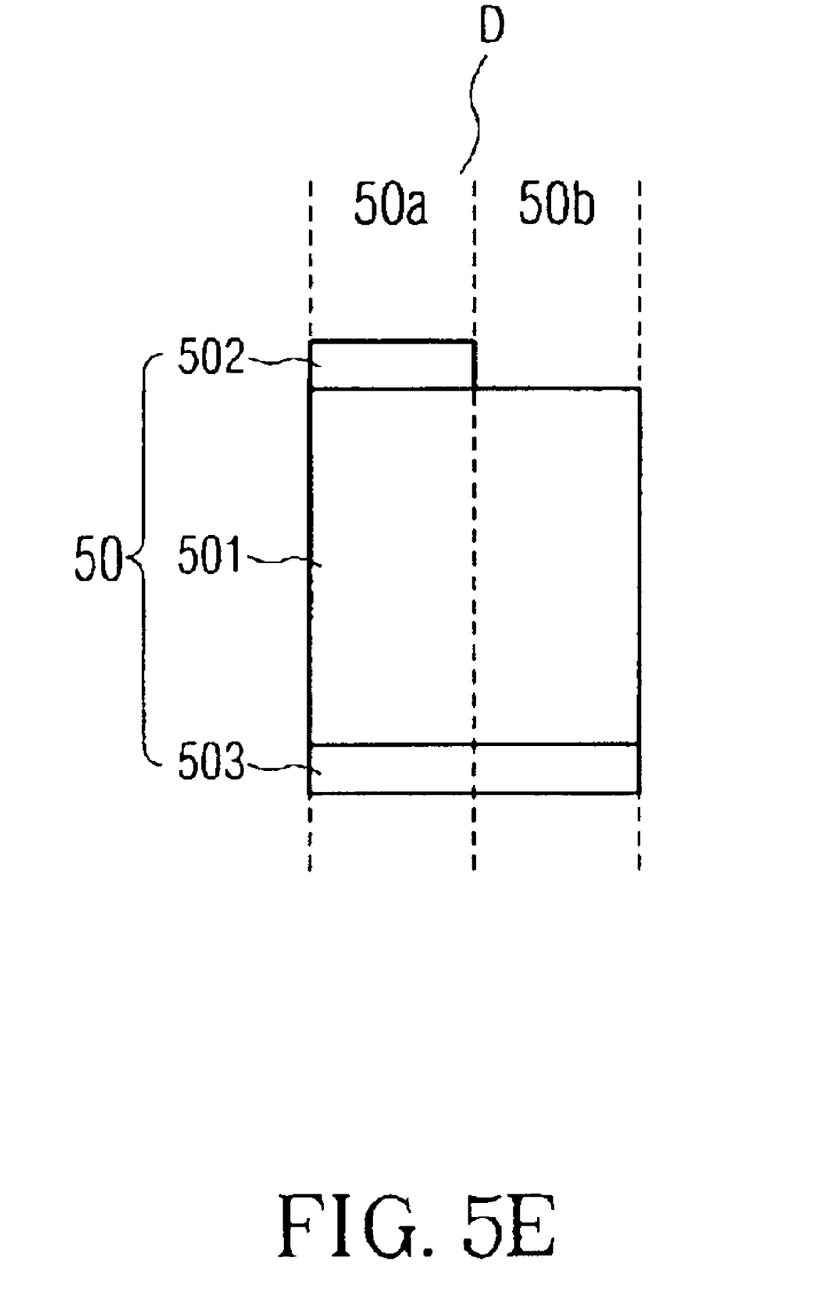
Figure 5F:
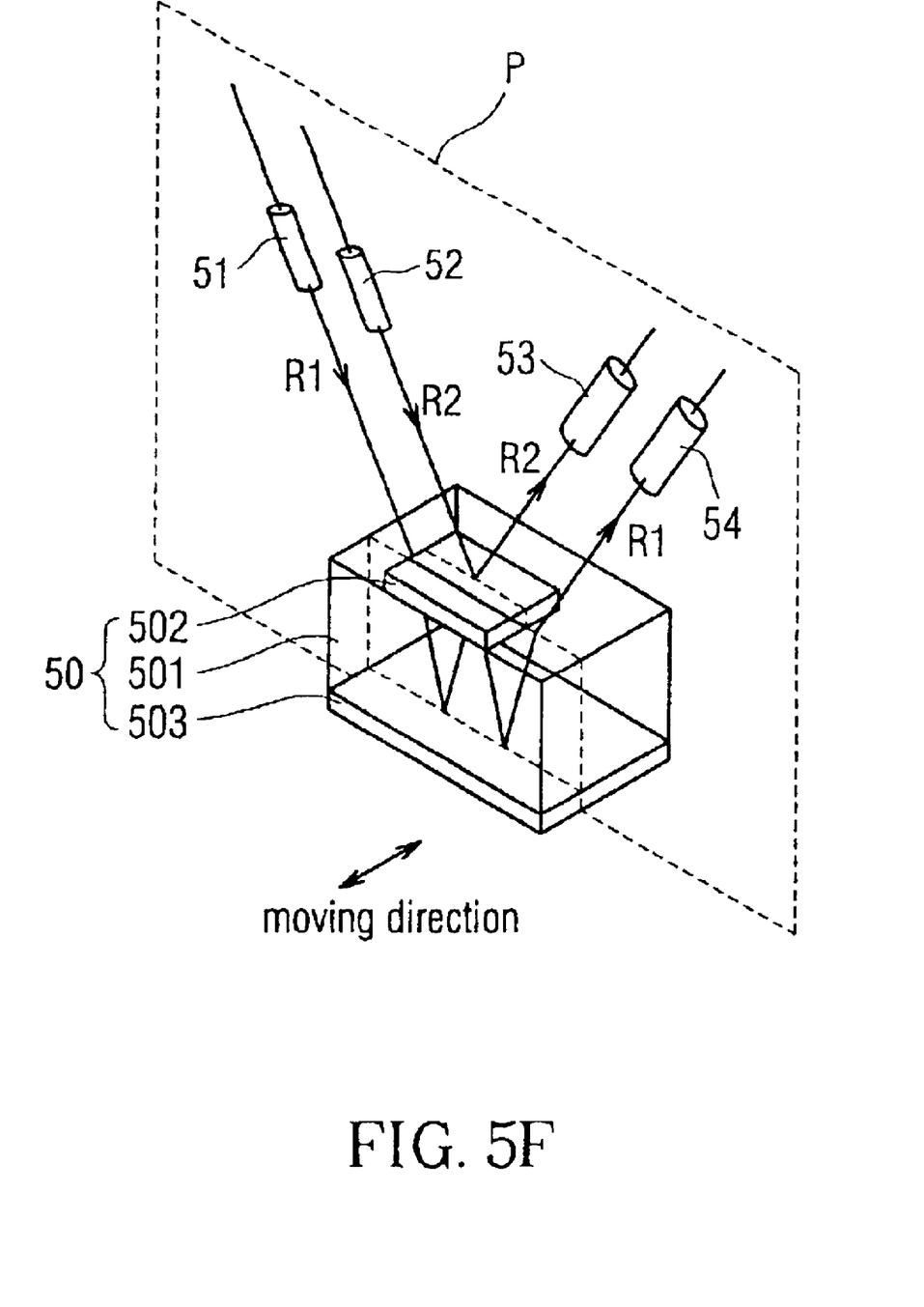

FIGS. 5A to 5F show an optical switch 5 in accordance with the second embodiment of the invention. FIGS. 5A and 5B are front and side views of the optical switch 5 at a first state, respectively. FIGS. 5C and 5D are front and side views of the optical switch 5 at a second state, respectively. FIG. 5E is a schematic illustration showing a reflective device 50 divided into two reflective regions in the optical switch 5. FIG. 5F is a perspective view of the optical switch 5.

Referring to FIG. 5A, the optical switch 5 includes a reflective device 50, four collimators 51, 52, 53 and 54, and a switching device 55. The collimators 51 and 52 are disposed at a first input end and a second input end of the optical switch 5. The collimators 53 and 54 are disposed at a first output end and a second output end of the optical switch 5. The reflective device 50 includes a flat glass 501 and reflective films 502 and 503 coated or attached on two optical planes of the flat glass 501, respectively. The switching device 55 includes a motor 551, a gear shell 552, a lead screw 553 and a nut 554. The detailed description about that the switching device 55 moves the reflective device 50 and other alternative ways are all well known to those skilled in the art, and are thus omitted.

Referring to FIG. 5E, the reflective device 50 in this embodiment is divided into two reflective regions 50a and 50b. The reflective film 502 is only disposed in the reflective region 50a, and the reflective film 503 is disposed all over the reflective regions 50a and 50b. In this embodiment, a plane D is used for dividing the reflective regions 50a and 50b, and is perpendicular to an optical plane of the flat glass 501.

Referring to FIG. 5B, when the optical switch 5 is at the first state, the first ray R1 and the second ray R2 received by the collimators 51 and 52 are incident on the reflective region 50a of the reflective device 50. At this state, as shown in FIG. 5A, the second ray R2 is reflected from the reflective film 502 to the collimator 53. In addition, the first ray R1 is transmitted into the flat glass 501 and sequentially reflected to the collimator 54 by the reflective films 503, 502 and 503 in the named order.

Referring to FIG. 5D, when the optical switch 5 is at the second state, the first ray R1 and the second ray R2 from the collimators 51 and 52 are incident on the reflective region

50b of the reflective device 50. At this state, as shown in FIG. 5C, since the reflective film 502 is not extended to the reflective region 50b, both the first ray R1 and the second ray R2 are incident on the flat glass 501, and reflected from the reflective film 0.503 to the collimators 53 and 54, respectively.

Comparing the above-mentioned first state with the second state, it can be easily understood that using the switching device 55 to move the reflective device 50, the first ray R1 and the second ray R2 can be switched and output to different collimators. At the first state, the first ray R1 is output from the collimator 54 while the second ray R2 is output from the collimator 53. Contrary to the first state, the first ray R1 is output from the collimator 53 while the second ray R2 is output from the collimator 54 at the second state.

Referring to FIG. 5F, the moving direction of the reflective device 50 in this embodiment is substantially perpendicular to a plane P containing the optical paths of the first ray R1 and the second ray R2. In other words, since the plane dividing the reflective regions 50a and 50b is perpendicular to the optical plane of the flat glass 501, the plane P containing the first ray R1 and the second ray R2 is also perpendicular to the optical plane of the flat glass 501. Therefore, moving the reflective device 50 along the arrow direction as shown in FIG. 5F, the plane P containing the first ray R1 and the second ray R2 can be switched between the reflective regions 50a and 50b.

It should be noted that the switching device 55 may also move the collimators 51, 52, 53 and 54 to achieve the object of switching the reflective regions if the reflective device 50 is fixed. In other words, as long as the switching device 55 can produce relative displacement between the collimators and the reflective device, the object of switching the reflective regions entered by the first ray R1 and the second ray R2 can be achieved.

In addition to the above-mentioned 2×2 optical switch, the optical switch of this embodiment can be an optical switch with arbitrary numbers of input end and output end. For example, referring to FIGS. 6A to 6D, another aspect of this embodiment is a 3×3 optical switch including three input ends and three output ends. The collimators 61, 62 and 63 are disposed at the three input ends of the optical switch 6, respectively. The collimators 64, 65 and 66 are disposed at the three output ends of the optical switch 6, respectively.

Figure 6A:
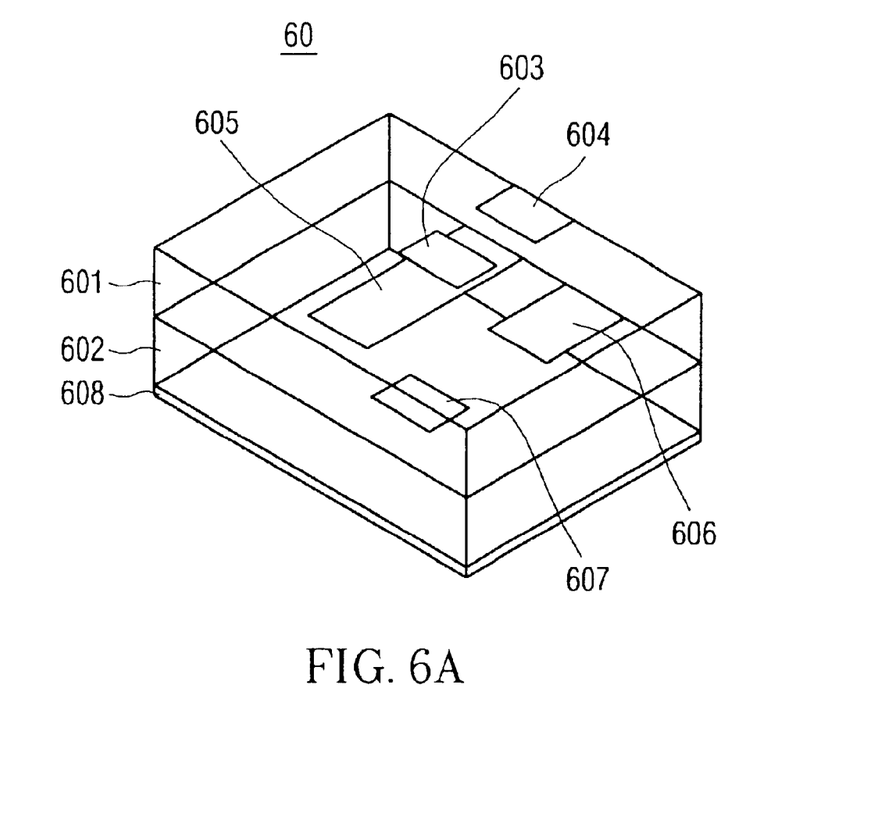
FIGS. 6A to 6D are schematic illustrations showing the optical switch in accordance with another aspect of the second embodiment of the invention.

A reflective device 60 of the optical switch 6 can be an optical reflection matrix structure including two flat glasses 601 and 602 and a plurality of reflective films 603 to 608. The reflective films 603 and 604 are coated or attached on the flat glass 601. The reflective films 605, 606 and 607 are coated between the flat glass 601 and 602. The reflective film 608 is coated beneath the flat glass 602.

Figure 6B:
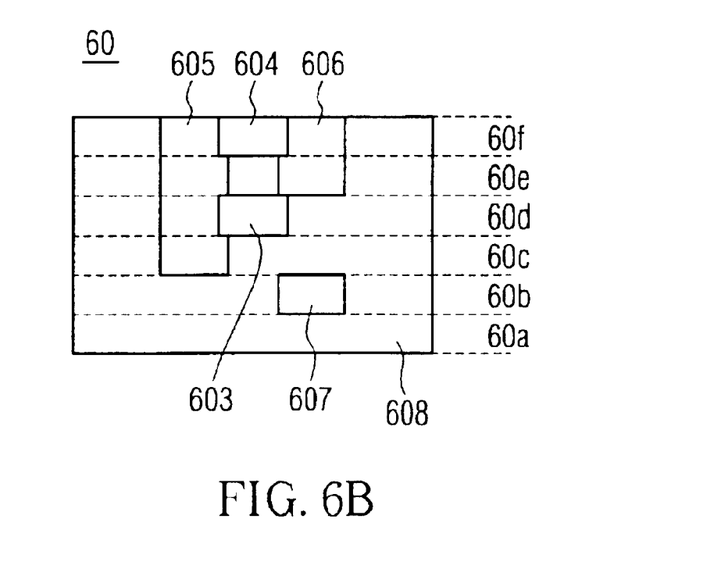

FIG. 6B is a top view of the reflective device 60 of FIG. 6A and shows the relatively positional relationship among the reflective films. Referring to FIG. 6B, the reflective device 60 includes six reflective regions 60a to 60f. The position distributions of the reflective films at each of the reflective regions are not the same. Accordingly, it is possible to obtain different output combinations by switching the rays to different reflective regions.

Figure 6C:
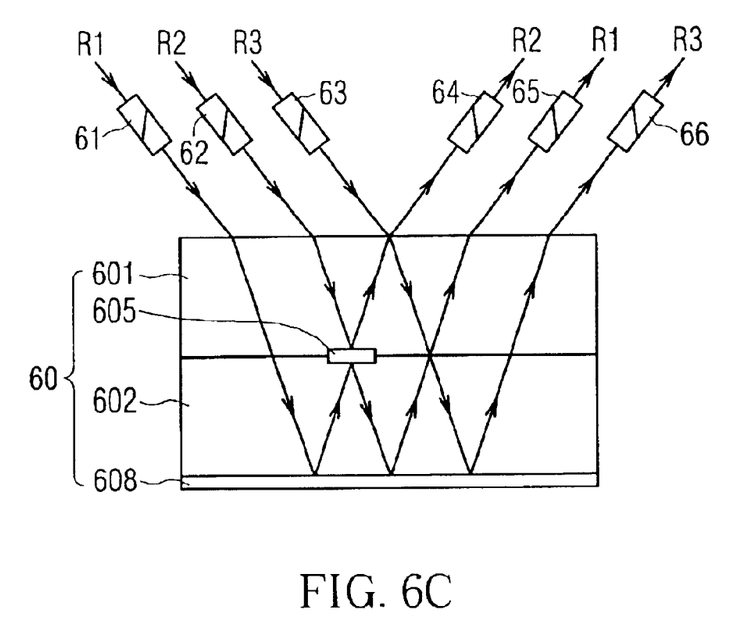

For example, FIG. 6C shows the condition in which the first ray R1, the second ray R2 and the third ray R3 input from the collimators 61, 62 and 63 are incident on the reflective region 60c, respectively. In the reflective films 603 to 608, only the reflective films 605 and 608 extend to the reflective, region 60c. Therefore, the first ray R1, the second ray R2 and the third ray R3 only can be reflected by the reflective films 605 and 608.

As shown in FIG. 6C, after the first ray R1 from the collimator 61 is incident on the reflective device 60, it passes through the flat glasses 601 and 602 and is reflected by the reflective film 608. After the first ray R1 is reflected by the reflective film 608, it goes back to the reflective film 608 by the reflective film 605. Then, the reflective film 608 reflects the first ray R1 which passes through the flat glasses 602 and 601 and then arrives at the collimator 65. After the second ray R2 from the collimator 62 is incident on the reflective device 60, it passes through the flat glass 601 and is reflected by the reflective film 605. Then, the second ray R2 passes through the flat glass 601 and arrives at the collimator 64. After the third ray R3 from the collimator 63 is incident on the reflective device 60, it passes through the flat glasses 601 and 602 and is reflected by the reflective film 608. Then, the third ray R3 passes through the flat glasses 602 and 601 and arrives at the collimator 66.

It can be easily understood from the above-mentioned description that the output combinations, after the first ray R1, the second ray R2 and the third ray R3 are reflected by the reflective region 60c, are as follows:

| | input end | output end |
| --- | --- | --- |
| First ray | collimator 61 | collimator 65 |
| second ray | collimator 62 | collimator 64 |
| Third ray | collimator 63 | collimator 66 |

Figure 6D:
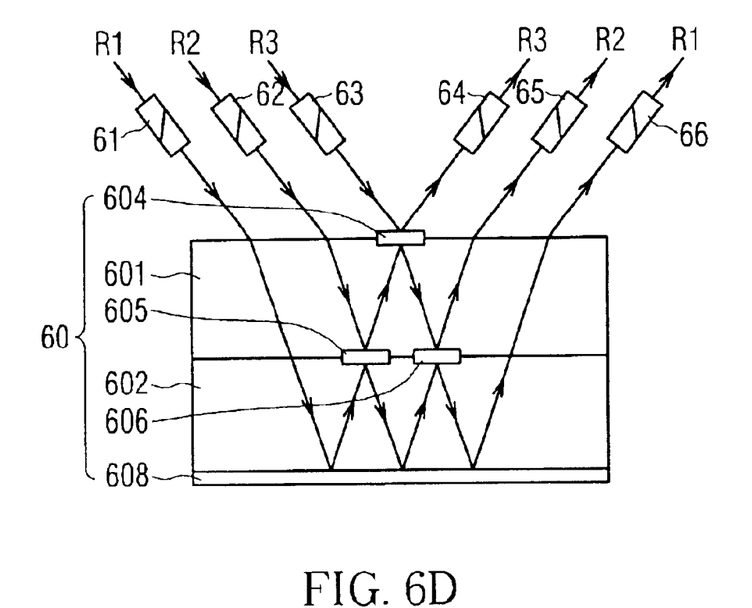

FIG. 6D shows the condition in which the first ray R1, the second ray R2 and the third ray R3 are incident on another reflective region 60f. The reflective films of the reflective region 60f include the reflective films 604, 605, 606 and 608.

As shown in FIG. 6D, after incident on the reflective device 60, the first ray R1 passes through the flat glasses 601 and 602. Then, the first ray R1 is sequentially reflected by the reflective films 608, 605, 608, 606 and 608 in the reflective device. Finally, the first ray R1 passes through the flat glasses 602 and 601, and arrives at the collimator 66. After the second ray R2 enters the reflective device 60, it passes through the flat glass 601. Then, the reflective films 605, 604 and 606 reflect the second ray R2 sequentially in the reflective device. Finally, the second ray R2 passes through the flat glass 601 and arrives at the collimator 65. After the third ray R3 enters the reflective device 60, it is directly reflected to the collimator 64 by the reflective film 604.

As easily understood from the description mentioned above, the output combinations, after the first ray R1, the second ray R2 and the third ray R3 are reflected by the reflective region 60f, are as follows:

| | input end | output end |
| --- | --- | --- |
| First ray | collimator 61 | collimator 66 |
| second ray | collimator 62 | collimator 65 |
| Third ray | collimator 63 | collimator 64 |

The output results from each ray reflected by the reflective regions 60c and 60f in this embodiment have been described. Since the arrangement of the reflective films is not the same in each of the reflective regions, the reflective device 60 has to be moved to drive each ray into different reflective regions. The optical switch disclosed in this embodiment can switch each ray to be output from different collimators. The output combinations of each of the reflective region is as follows:

|  | first ray | second ray | third ray |
|---|---|---|---|
| reflective region 60a | collimator 64 | collimator 65 | collimator 66 |
| reflective region 60b | collimator 64 | collimator 66 | collimator 65 |
| reflective region 60c | collimator 65 | collimator 64 | collimator 66 |
| reflective region 60d | collimator 65 | collimator 66 | collimator 64 |
| reflective region 60e | collimator 66 | collimator 64 | collimator 65 |
| reflective region 60f | collimator 66 | collimator 65 | collimator 64 |

Third Embodiment

Figure 7A:
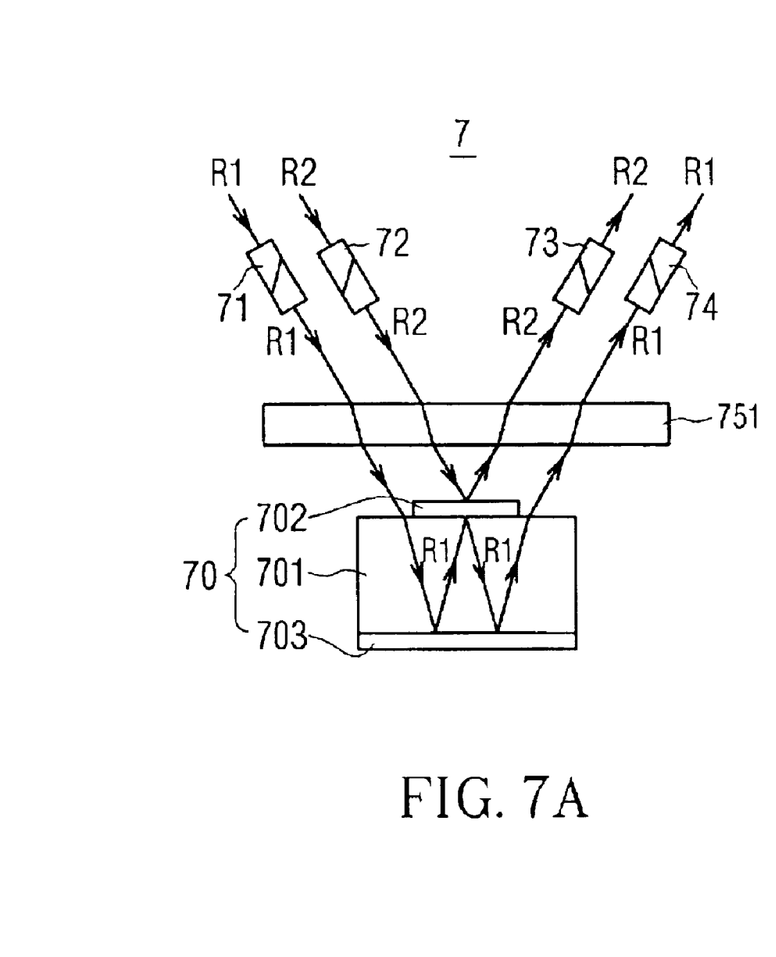
FIGS. 7A to 7D are schematic illustrations showing an optical switch in accordance with a third embodiment of the invention.
Figure 7B:
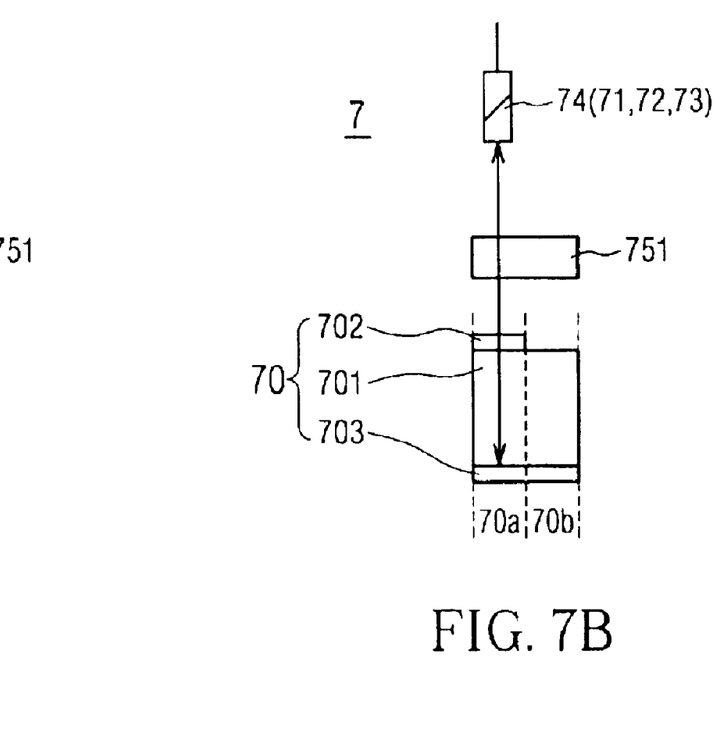
Figure 7C:
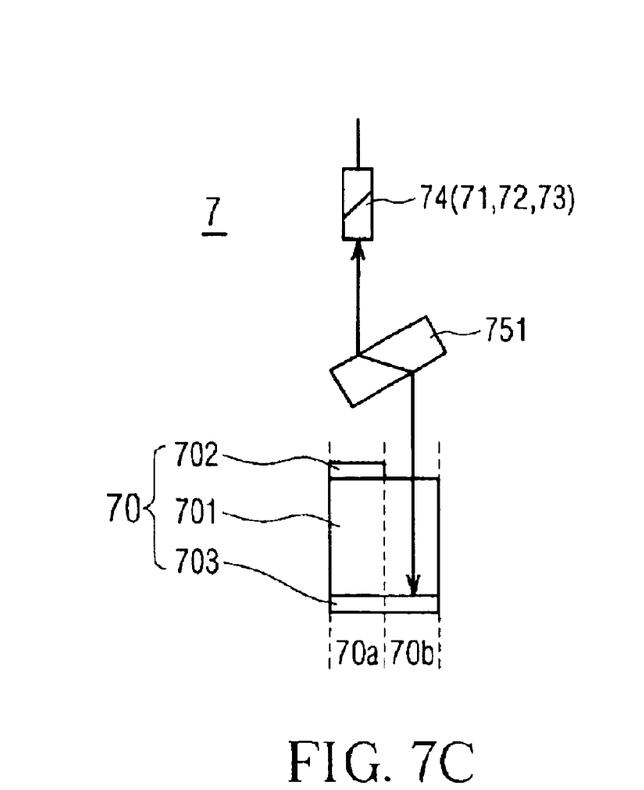
Figure 7D:
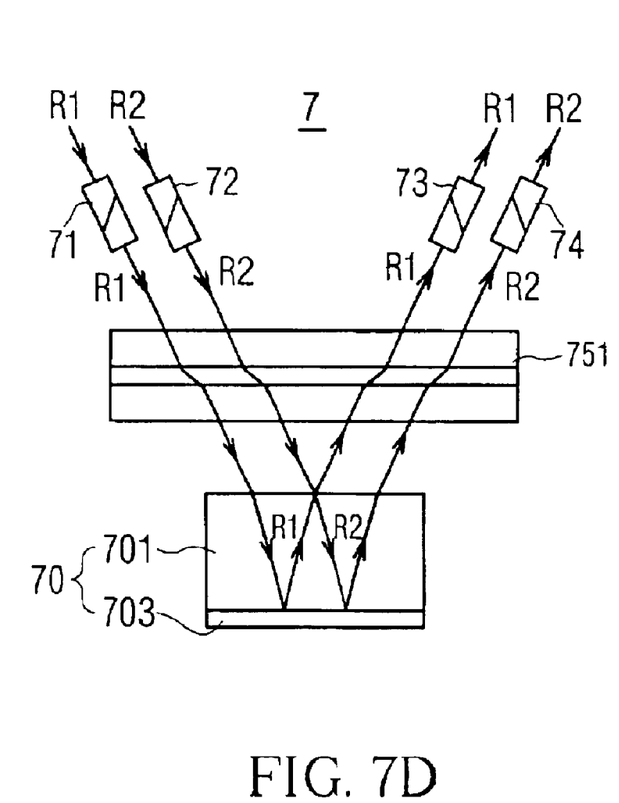

FIGS. 7A to 7D show an optical switch 7 in accordance with a third embodiment of the invention. FIGS. 7A and 7B are front and side views showing the optical switch 7 at a first state. FIGS. 7C and 7D are side views showing the optical switch 7 at a second state.

Referring to FIG. 7A, this embodiment is similar to the second embodiment mentioned above. The optical switch 7 includes a reflective device 70, four collimators 71, 72, 73 and 74, and a switching device 75. The collimators 71 and 72 are disposed at a first input end and a second input end of the optical switch 7. The collimators 73 and 74 are disposed at a first output end and a second output end of the optical switch 7. The reflective device 70 includes a flat glass 701 and reflective films 702 and 703 coated or attached on upper and lower sides of the flat glass 701, respectively. The reflective device 70 is divided into two reflective regions 70a and 70b. The reflective film 702 is formed in the reflective region 70a, while the reflective film 703 is formed in both of the reflective regions 70a and 70b.

The difference between the third embodiment and the second embodiment is that the switching device 75 of the third embodiment is a rotatable flat glass 751 disposed between the collimators and the reflective device 70. When the first ray R1 and the second ray R2 from the collimators enter the reflective device 70 and are reflected from the reflective device 70 to the collimators, both of the first ray R1 and the second ray R2 will pass through the flat glass 751.

Referring to FIG. 7B, when the optical switch 7 is at the first state, the first ray R1 and the second ray R2 received by the collimators 71 and 72 enter the reflective region 70a of the reflective device 70. During this state, the second ray R2 is reflected to the collimator 73 by the reflective film 702. The first ray R1 enters the flat glass 701 and is reflected sequentially to the collimator 74 by the reflective films 703, 702 and 703, as shown in FIG. 7A.

Referring to FIG. 7D, when the optical switch 7 is at the second state, the first ray R1 and the second ray R2 received by the collimators 71 and 72 are refracted by the flat glass 751 and enter the reflective region 70b of the reflective device 70. At this state, this embodiment is similar to the second embodiment mentioned above. Referring to FIG. 7C, since the reflective film 702 is not extended to the reflective region 70b, both of the first ray R1 and the second ray R2 enter the flat glass 701 and are reflected to the collimators 73 and 74 by the reflective film 703.

As easily understood from FIGS. 7B and 7D, the first ray R1 and the second ray R2 are selectively reflected by the reflective regions 70a and 70b of the reflective device 70 by rotating the flat glass 751 in the optical switch 7 of this embodiment. In other words, different deflection offsets are generated by changing the rotating angle of the flat glass 751 after the first ray R1 and the second ray R2 pass through the flat glass 751. Using the differences between the deflection offsets, the first ray R1 and the second ray R2 can be selectively incident on the reflective regions 70a or 70b.

As easily understood from the description mentioned above, the reflective elements are disposed in parallel for switching the corresponding relationship between the rays and the reflective elements. In addition, the optical switch of the invention may be designed as an optical switch in the form of "one-to-many" or "many-to-many." According to the invention, the number of the optical elements that have to be moved can be greatly decreased. Therefore, the optical switch of the invention can easily control the alignment of the collimators and reduce the error occurred during switching, thereby simplifying the structure of the optical switch and lowering the manufacturing cost.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. An optical switch comprising:
   a first input end for receiving a first ray;
   a second input end for receiving a second ray;
   a first output end;
   a second output end;
   a reflective device for receiving the first and second rays, wherein the reflective device further comprises:
      a flat glass having at least one optical plane; and
      a reflective element provided on the optical plane, wherein the reflective element is coated or attached on the optical plane and the reflective device includes a mirror disposed in parallel with the reflective element; and
   a switching device for changing a relative position between the reflective device and the first and second rays, wherein
      when the reflective device is moved away from the first and second input ends, the first ray and the second ray are output from the first output end and the second output end, respectively, and
      when the reflective device is moved close to the first and second input ends, the first ray and the second ray are output from the second output end and the first output end, respectively.

2. The optical switch according to claim 1, wherein:
   the reflective device comprises a flat glass having two optical planes, and a first reflective film and a second reflective film coated or attached on the optical planes, respectively;
   when the reflective device is away from the input ends, both of the first ray and the second ray are reflected by the first reflective film; and
   when the reflective device is moved close to the input ends, the first ray passes through the flat glass and is reflected by the second reflective film, and the second ray is reflected by the first reflective film.

3. The optical switch according to claim 2, wherein the optical planes are parallel to each other.

4. The optical switch according to claim 1, further comprising:
   four collimators disposed at the first input end, the second input end, the first output end and the second output end, respectively, to collimate the first ray and the second ray.

5. The optical switch according to claim 1, wherein incident angles of the first and second rays incident on the reflective device are non-zero-degree angles.

6. The optical switch according to claim 1, wherein the reflective device further comprises a minor disposed in parallel with the optical planes.

7. An optical switch comprising:

a first input end for receiving a first ray;

a second input end for receiving a second ray;

a first output end;

a second output end;

a reflective device including a flat glass having two optical planes, wherein a first reflective film and a second reflective film are coated or attached on the optical planes, respectively; and a switching devicefor changing a relative position between the reflective device and the first and second rays, wherein when the reflective device is away from the input ends, both of the first ray and the second ray are reflected by the first reflective film; and when the reflective device is moved close to the input ends, the first ray passes through the flat glass and is reflected by the second reflective film, and the second ray is reflected by the first reflective film.

8. An optical switch comprising:

at least one input end for receiving at least one ray; at least one output end;

a reflective device having two optical planes and a plurality of reflective films, each of the reflective films being provided on a predeterniined position of one of the optical planes such that the reflective device has a plurality of reflective regions, and the at least one ray is reflected to a corresponding output end after entering one of the reflective regions from the input end; and a switching device including a rotatable flat glass disposed between the input end and the reflective device, wherein the rotatable flat glass is rotated to change a deflection offset of the at least one ray after being refracted so as to transmit the at least one ray into one of the reflective regions, and switch output combinations of the at least one ray output from the at least one output end.

* * * * *